March 17, 1931.  W. P. RADT  1,796,875
ROPE HOIST
Filed May 14, 1928

W. P. Radt
INVENTOR

Patented Mar. 17, 1931

1,796,875

UNITED STATES PATENT OFFICE

WILHELM PETER RADT, OF COLOGNE-MULHEIM, GERMANY, ASSIGNOR TO FELTEN & GUILLEAUME CARLSWERK ACTIEN-GESELLSCHAFT, OF COLOGNE-MULHEIM, GERMANY

ROPE HOIST

Application filed May 14, 1928, Serial No. 277,741, and in Germany May 17, 1927.

Rope hoists are known, in which a round rope, which supports the load and the counterpoise, runs over a single driving pulley and the requisite driving friction between the pulley and the rope is obtained by the peripheral groove in which the rope is wedged being made V-shaped. When the groove is V-shaped, only a few wires will, of course, form the supporting and friction surface of the rope and will be more stressed than the others, which will result in these wires breaking and spreading and the rope being prematurely destroyed. In order to overcome this drawback, the groove, where ropes of round cross-section are used, has been made partly circular or approximately circular, while in some cases polygonal ropes have been used and as large a supporting surface as possible has been obtained by making the cross section of the groove of a suitable shape. Owing to the helical external surface of the ordinarily laid rope, the extent of the supporting surface is different at different parts of the periphery of the rope pulley, so that the separate parts of the surface of the rope are unequally stressed.

The present invention has for its object to provide a rope hoist having a single driving pulley, in which a known rope of this kind having a polygonal cross-section is used and in which the cross-sectional form of the groove changes continuously around the periphery in such a manner that it adapts itself at every part to the position of the cross-section of the ordinarily laid rope.

The accompanying drawing shows one constructional example of a rope hoist according to this invention as well as a rope hoist of the known type.

Figure 1:
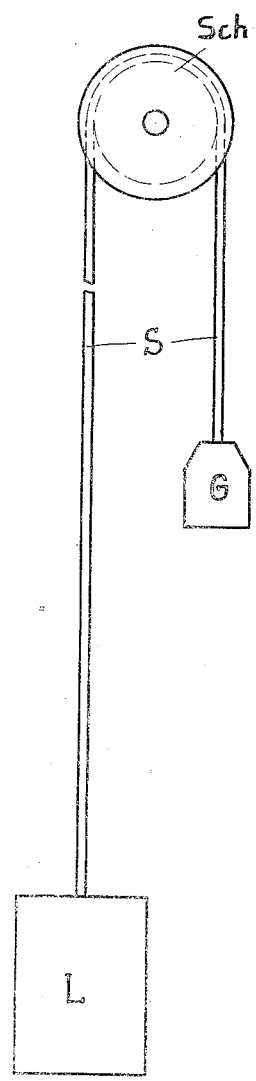
Fig. 1 shows a rope hoist of the known type referred to in the introduction; S is the round rope, L is the load and G the counterpoise, Sch being a pulley provided with a V-shaped groove.
Figure 2:
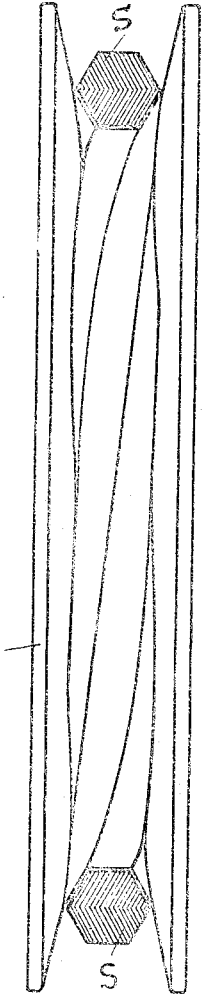
Fig. 2 shows a cross section of a constructional form of the pulley and rope according to this invention, Sch being the pulley and S the polygonal-sectioned rope.
Figure 3:
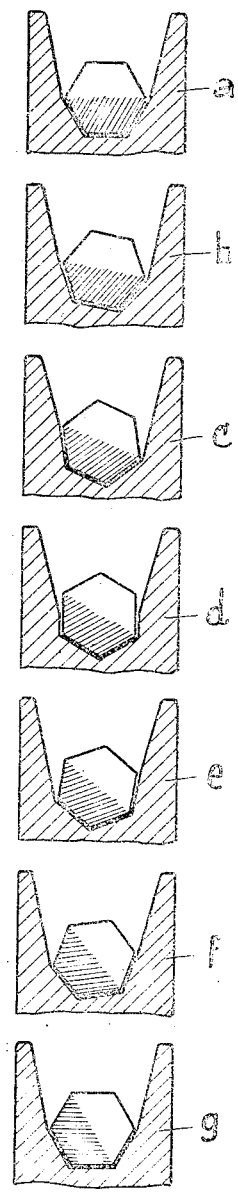
Figs. 3a–3g show sections of the rope and groove at successive points around the periphery of the driving pulley.

In the hoist according to this invention, as seen from Figs. 2 and 3, the supporting surface of the rope in the groove is adapted accurately to the cross section of the rope. With such an arrangement no wedging action is made use of, but by the bearing pressure on the helical surface of the rope, force is exerted on the rope in its own longitudinal direction, which the rope follows, when the pulley is driven round, as it cannot twist to any appreciable extent, due to the loads being guided. It is obvious that in this case the rope will be held all the firmer the shorter the pitch of the lay of the rope relative to its diameter.

In addition to this drive, which is determined by the helical position of the outer wires of the rope, a wedging effect may be employed for driving the rope through the peripheral groove being so formed that the rope will, at the same time, be wedged in the groove. This can be effected by the groove faces being tapered with respect to those of the rope towards the centre of the pulley. The jamming or wedging action need not be so great as in the case of a round rope and a groove of V-shaped cross-section. The new arrangement, therefore, has the advantage that at all parts of the rope pulley only about one-half of the rope surface takes part in the transmission of power between the pulley and the rope, so that the surface of the rope is not liable to be damaged, so that the separate wires of the rope are not unduly stressed, as is the case in the arrangements described above. Hence with the arrangement according to the present invention, the life of the rope is increased. Instead of the regular hexagon shown by way of example in the drawing, other polygonal shapes may be used for the cross-section of the rope. The grip, however, which the rope has in the groove decreases with an increase in the number of sides. As will be readily understood, the periphery of the driving pulley must, in the case of a rope the cross-section of which is an $n$-sided figure, always be a multiple of the $n$th part of the pitch of the lay of the rope, so as to obtain a continuous groove.

What I claim is:

A rope hoist in combination with a driving pulley, the rope having a plurality of flat surfaces intersecting along twisted lines and the peripheral groove of the pulley similarly consisting of flat surfaces intersecting along twisted lines, the widths of the intersecting surfaces of the rope being equal to the widths of the intersecting surfaces of the peripheral groove and the twist of the intersection lines on the rope corresponding to the twist of the intersection lines on the peripheral groove of the pulley, as and for the purposes set forth.

In testimony whereof I have signed my name to this specification.

WILHELM PETER RADT.